United States Patent [19]

Danis

[11] 3,892,216

[45] July 1, 1975

[54] COMPOSITE ARTICLE AND METHOD OF MAKING SAME

[75] Inventor: Louis J. Danis, Battle Creek, Mich.

[73] Assignee: Eaton Corporation, Cleveland, Ohio

[22] Filed: Oct. 23, 1973

[21] Appl. No.: 408,697

[52] U.S. Cl. ............ 123/191 S; 29/197.5; 29/199; 123/32 C; 123/32 J; 123/32 AA; 123/32 SP; 123/75 B
[51] Int. Cl. ..................... F02b 19/16; F02b 19/10
[58] Field of Search .......... 29/199, 197.5; 123/32 C, 123/32 D, 32 J, 32 AA, 32 ST, 32 SP, 191 S, 191 SP

[56] References Cited
UNITED STATES PATENTS

| | | | |
|---|---|---|---|
| 2,741,229 | 4/1956 | Stump | 123/32 C |
| 2,932,289 | 4/1960 | Witzky | 123/32 A |
| 2,969,050 | 1/1961 | Greirer et al. | 123/32 |
| 3,044,454 | 7/1962 | Sutton | 123/32 C |
| 3,168,381 | 2/1965 | Finnegan et al. | 29/197.5 |
| 3,285,717 | 11/1966 | Fischer | 29/197.5 |
| 3,505,104 | 4/1970 | Ingerson | 29/199 X |
| 3,615,280 | 10/1971 | Ingerson | 29/119 |
| 3,782,929 | 1/1974 | Werner | 29/197.5 X |

FOREIGN PATENTS OR APPLICATIONS
204,195  3/1955  Australia........................... 123/32 J Primary Examiner—Charles J. Myhre
Assistant Examiner—Tony Argenbright
Attorney, Agent, or Firm—Teagno & Toddy

[57] ABSTRACT

A composite article capable of initially rapid heating and subsequent continuous rapid transfer of heat. The article has a core of material, preferably copper, having a minimum first predetermined value of thermal conductivity and an outer surface portion of metallic material of certain compositions such as aluminum, aluminum-rich alloy, nickel, or nickel-rich alloy. The composite article has oxidation resistance at elevated temperatures equivalent to AISI type 303 stainless steel and has a bulk thermal conductivity not less than a second predetermined value. In one embodiment the article is cup-shaped for defining an auxiliary compartment or pre-chamber for a combustion chamber of an internal combustion engine. The method includes immersing the core in a bath of molten aluminum or aluminum-rich alloy, removing the article, and heating to a temperature of substantially 800° C.

9 Claims, 1 Drawing Figure

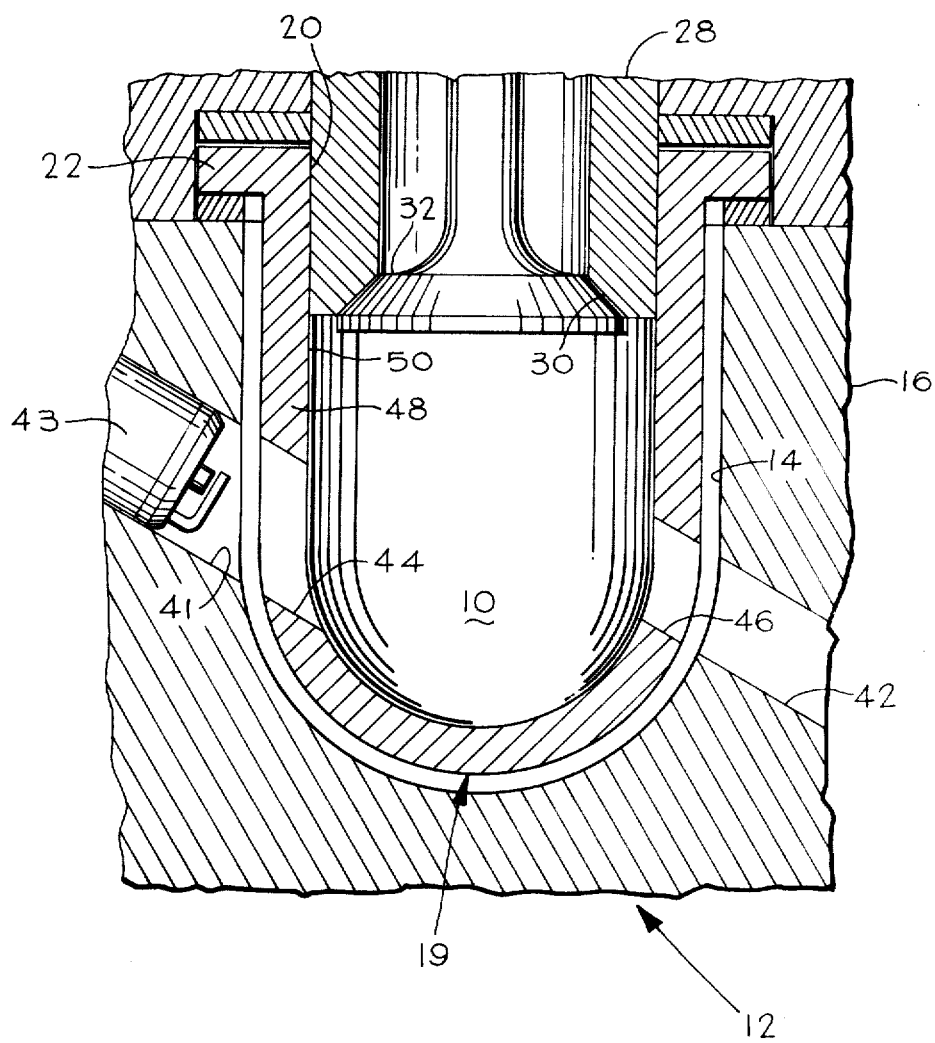

COMPOSITE ARTICLE AND METHOD OF MAKING SAME

BACKGROUND OF THE INVENTION

Recent efforts to reduce the exhaust emissions of internal combustion engines, particularly those of the reciprocating type, have involved staging the combustion for each power cycle of the engine.

It has been found desirable to use a lean mixture in the main combustion chamber in order to provide fewer undesirable by-products of combustion or harmful emissions as they are generally known as, for example, oxides of nitrogen and unburned hydrocarbons.

The most critical period of operation of an internal combustion engine with respect to exhaust is that period following first firing when the engine is started from a cold condition. The cold portions of the cylinder wall and cylinder head cause condensation of the fuel mixture, and further cause undesirable quenching of the burning of the hot gases. When the engine has been operating for a period of time and/or under a sufficient load that it is brought to its normal operating temperature, the combustion of hot gases becomes more efficient and the problem of exhaust emissions is greatly reduced. Therefore it has been found desirable to provide some means of accelerating the initial heating or warm-up of the combustion chamber of the engine when it is started from the cold condition. It has been found that providing two-stage ignition of the fuel charge produces a rapid warm-up effect in a cold combustion chamber and minimizes the exhaust emissions during engine warm up.

More particularly, with regard to reciprocating engines of the spark-ignition type, it has been discovered and it is known in the art that, if a separate, auxiliary, compartment is provided within the combustion chamber and a rich fuel mixture provided within the separate chamber, ignition of the rich mixture may be used to ignite a lean mixture in the main compartment of the combustion chamber. This particular type of two-stage fuel burning is referred to as "pre-chamber" or "stratified-charge" combustion. See, for example, the published German patent specification No. 2,259,286 and 2,302,051 published Aug. 2 and Aug. 29, 1973, respectively.

In the stratified-charge type combustion, a separate auxiliary compartment or pre-chamber is charged at the appropriate time during each cycle, with a very rich mixture of fuel which is then ignited by a conventional spark ignition device. The hot gases from the burning of the rich mixture in the pre-chamber are channeled through passages in the pre-chamber to the main compartment of the combustion chamber, and these hot gases serve as a torch to ignite a lean mixture in the main chamber. This manner of combustion has been a satisfactory solution to the problem of directly spark-igniting a lean mixture in the main combustion chamber.

Previous attempts to provide an auxiliary compartment or pre-chamber in the main combustion chamber of an internal combustion engine have generally used the technique of providing a cup-shaped or hollow tubular insert extending into the main combustion chamber from the cylinder head of the engine.

The pre-chamber is thus formed by the interior of the cup-shaped or tubular member and desired ports are provided in the wall of the cup-shaped member for cummunication of the interior of the pre-chamber with the spark-igniting means and for communication of the hot gases from the pre-chamber with the fuel mixture in the main combustion chamber. The cup-shaped member is thus usually attached by the open end thereof to the wall of the combustion chamber as, for example, to a portion of the cylinder head of the engine. The rich fuel charge for the pre-chamber may then be supplied to the pre-chamber through the open end of the cup-shaped member attached to the cylinder head by porting the cylinder head to the cup-shaped member. This arrangement has been found desirable because it permits the addition of a pre-chamber to existing cylinder heads without complete redesign on the cylinder head, and also lends itself to economical manufacturing techniques.

In order for the cup to serve its function of rapidly heating the gases in the main combustion chamber upon cold starting, the cup must be made of a material having a high thermal conductivity. However, the pre-chamber cup is exposed to the hot gases of the main combustion chamber, and therefore must have very good oxidation resistance at elevated temperatures and particularly temperatures of up to 850° C. Unfortunately, materials having a desirable high coefficient of thermal conductivity do not provide sufficient oxidation resistance at these elevated temperatures. Furthermore, the materials that have the desired oxidation resistance do not have sufficient thermal conductivity. If a pre-chamber cup is employed on any of these materials, upon the engine's reaching operating temperature, the pre-chamber cup is unable to transfer heat to the cylinder head at a sufficient rate and the cup suffers destructive overheating.

It has therefore been desirable to provide an article, and particularly a pre-chamber cup for an internal combustion engine, which initially heats rapidly from the burning of the mixture in the pre-chamber and, upon reaching normal operating temperature, maintains rapid heat transfer to the engine. Such a cup must also have sufficient oxidation resistance at normal combustion chambers operating temperatures to withstand the corrosion attack of the hot combustion gases.

SUMMARY OF THE INVENTION

The present invention provides a solution to the problem of providing an article, for example, pre-chamber cup for an internal combustion engine, which has an overall high thermal conductivity enabling rapid initial warm-up and yet exhibits suitable oxidation resistance to withstand the corrosive attack of hot combustion gases. The article of the present invention is a composite formed of a core of material having thermal conductivity greater than a first predetermined value with the article having an outer surface region encasing the core and formed of material such as aluminum, aluminum-rich alloy, nickel, or nickel-rich alloy. The resultant composite article has an oxidation resistance at elevated temperatures equivalent to that of corrosion-resistance steel and yet maintains an overall coefficient of thermal conductivity greater than a second predetermined minimum value and substantially higher than that of the corresponding value for any known corrosion resistant steel. The article of the present invention has been successfully embodied in a cup for defining an auxiliary compartment or pre-chamber formed within the main combustion chamber of an internal combustion engine.

The method of making the article includes immersing a copper core in a bath of molten aluminum or aluminum-rich alloy, removing the immersed core from the bath, and then subsequently heating the article to a temperature of substantially 850° C to disperse the material of the casing into the core. The present invention thus provides an article which lends itself to rapid initial warm up and one which maintains sufficient ability to transfer heat and oxidation resistance at elevated temperatures. Therefore, the present article is capable of operating in service environments heretofore reserved for corrosion-resistant steels and other exotic alloys, and yet the article is substantially lower in cost than articles made of such materials.

BRIEF DESCRIPTION OF THE DRAWINGS

FIG. 1 is a cross sectional view of the preferred embodiment of the invention in the form of a cup defining an auxiliary compartment in the combustion chamber of an internal combustion engine.

DETAILED DESCRIPTION

Referring now to FIG. 1 of the drawings, the article 10 is shown disposed within the combustion chamber 12 of an internal combustion engine. A cavity 14 is formed in the cylinder head 16 of the engine. The article in the preferred embodiment is shaped in the form of a cylindrical cup 18 having a closed end 19 and an open end 20. The cup has the diameter and the connfiguration of the closed end 19 shaped so as to be disposed in closely fitting spaced relationship to the cavity 14 in the cylinder head. The closed end of the cup 19 preferably has a hemispherical shape.

The open end 20 of the cup 18 has a flange 22 formed therein which is adapted for mounting the cup to the contact with the portions of the cylinder head 16. In the preferred practice of the invention, relatively soft metallic sealing washers 24, 26, respectively, are provided to closely interfit the opposite axial faces of the flange 22. The washers 24, 26 are preferably formed of copper material or other metal having a deformability coefficient of thermal conductivity equivalent to that of copper. If desired, the cylinder head may have the portion containing the cavity 14 removable from the portion contacting the outer face of the cup flange 22 to permit ease of installation of the cup into the cavity.

In accordance with the usual practice in providing a pre-chamber, a fuel supplying passage is provided by a hollow insert 28 in the form of a tubular metal member disposed within the inner periphery of the open end 20 of the cup for defining a fuel-charge port communicating with the interior of the prechamber cup. The end of the member 28 received in the cup has formed therein a valve seat 30 which has received thereagainst a poppet valve 32. The poppet valve 32 is movable from the closed position illustrated in the drawing to an open position spaced from the valve seat 30 so as to permit entry of a rich fuel mixture into the interior of the pre-cup 18. The open position of the valve will be readily apparent to those having ordinary skill in the art, and consequently, the valve open position is not illustrated in the drawings for clarity. Any suitable valve gear train may be provided for opening and closing the valve 30 at the appropriate time with respect to the position of the piston within the main combustion chamber.

The engine has the conventional spark igniting means in the form of spark plug 43 disposed in a threaded bore in the cylinder wall with the bore communicating with the cavity 14 provided in the cylinder head. The cavity 14 has a passage 42 provided therein to communicate the cavity with the main portion of the combustion chamber denoted generally at 12, and the details of which have been omitted from the drawing for convenience of illustration. The cup 18 has at least one aperture or hole 44 provided in the wall thereof coincident and aligned with the spark plug 40. An exit passage or port 46 is provided in the cup and is disposed, in the preferred practice, diametrically opposite the hole 44 adjacent the spark plug. However, the exit port may be disposed in other locations on the cup as, for example, the tip end of the cup, or alternatively, several apertures may be spaced about the cup as desired for ignition of the main chamber fuel charge. The exit port 46 is coincident and aligned with the passage 42 communicating with the main combustion chamber such that hot gases burning within the cup will exit through port 46 and passage 42 directly into the main combustion chamber.

The article of the present invention as embodied in the auxiliary pre-chamber cup for an internal combustion engine has the core 48 thereof formed of metallic material having a thermal conductivity not less than 130 B.T.U./square foot/foot/degree Fahrenheit/hour, and is preferably formed of copper material. The core 48 has an outer surface portion 50 encasing the core, which portion 50 is formed of a metallic material chosen from the group consisting of aluminum, aluminum-rich alloy, nickel, or nickel-rich alloy. The outer surface portion 50 encasing the core 48 may have any desired thickness less than generally one-fourth of the thickness of the wall of the cup 18. The minimum thickness of the outer surface portion 50 will be determined by a desired degree of protection against oxidation at elevated temperatures from the combustion gases. The article as embodied in a pre-chamber cup having a core of the description specified herein encased with the designated material for the outer region 50, a progressive oxidation resistance not less than that of AISI type 303 stainless steel when exposed for at least 2 hours to 0.1 atmosphere of oxygen at 800° C and also has a bulk thermal conductivity of not less than 40 B.T.U./square foot/foot/degree F/hour. Although the outer surface portion 50 encasing the core 48 of the article 10 may be formed from any of the designated aluminum or nickel materials, in the present practice of the invention an aluminum-silicon eutectic alloy has been found to be particularly well suited for a pre-chamber cup for an internal combustion engine.

The outer surface portion 50 encasing the core when formed of nickel or nickel-rich alloy may be applied by plating, for example, electro or electro-less plating. However, where aluminum or aluminum-rich alloy is used, it has been found particularly desirable to apply the outer surface casing by a novel method set forth hereinbelow. The preferred and novel method includes immersing the core in a bath of molten aluminum or aluminum-rich alloy, preferably aluminum-silicon eutectic alloy, and removing the immersed core from the bath. The article thus far formed is then heated to a temperature in the range of 775° C to 835° C and the article is maintained at this temperature for at least 2 hours. The soaking or maintaining of the article at the aforementioned temperature permits the eutectic aluminum-silicon alloy material of the outer surface region to commingle and disperse with the copper base material of the core in such a manner that an aluminum alloy of copper is formed at the interspersed region therebetween. The copper alloy thus formed provides the requisite oxidation resistance at elevated temperatures equivalent to that of AISI type 303 stainless steel with the completed article having a bulk thermal conductivity of at least 40 B.T.U./square foot/foot/degree Fahrenheit/hour, which is substantially less than the thermal conductivity of the copper core but substantially greater than the AISI type 303 stainless steel. In comparison, AISI type 303 stainless steel has a thermal conductivity of approximately 10–15 B.T.U./foot squared/foot/degree Fahrenheit/hour. The novel article constructed in the novel manner designated herein thus provides a unique cup for forming the pre-chamber in a stratified-charge internal combustion chamber.

The article of the present invention, by virtue of its high thermal conductivity, will provide such a pre-chamber cup which exhibits the desired rapid warm-up of the cup, yet one which will remain at a uniform temperature due to its capability of rapid heat transfer during normal continuous operation of the engine.

The following analysis will demonstrate the dramatic improvement which the present invention has provided in the design of a cup for an internal combustion engine pre-chamber.

Previous pre-chamber cups formed of stainless steel have failed by destructive overheating wherein the hot combustion gases burned holes in the closed end of the cup. Measurements of the temperature of the closed end of the cup have yielded temperature readings in the area of 1800° F and temperatures of only 400° at the flange end of the cup attached to the cylinder head. This indicates a temperature differential of 1400° F from the closed end 19 to the open end 20 of the cup. These temperatures have been found typical where a cup is made of a chromium-alloy corrosion resistant steel having a known coefficient of thermal conductivity of 10 B.T.U./square foot/foot/degree Fahrenheit/hour. The quantity of heat transferred to the stainless steel cup during these conditions may be composed as follows: $Q = A K \delta T$ where $Q$ is the quantity of heat, $A$ is the cross sectional area of the article and $\delta T$ is the temperature differential $T_{19} - T_{20}$ from one end to the other. Thus it will be seen, by substituting the known values of $K$ and $\delta T$ into this formula, that $Q$ divided by $A$ is equal to 14,000 B.T.U./square foot/foot/hour for the stainless steel cup.

However, if the same cup is made in accordance with the present invention having a bulk coefficient of thermal conductivity of at least 40 B.T.U./square foot/foot/degree Fahrenheit/hour, it will be seen that substitution of values $K = 40$ into the formula $Q/A = 14,000$ that a maximum temperature differential ($\delta T$) of 300° is present. For $T_{20} = 400°$ F it is readily seen that the cup of the present invention will have a maximum tip temperature $T_{19}$ of only 700° F. Therefore it will be seen that a cup made in accordance with the present invention will have a lower temperature differential from one end to the other in operation and will have a lower maximum tip temperature and thus will not fail from destructive overheating.

The present invention thus provides a unique article which has a core of copper with a casing of aluminum, aluminum-rich alloy, nickel or nickel-rich alloy which yields an article having an oxidation equivalent to that of AISI type 303 stainless steel at 800° C and yet the article of the present invention has a bulk thermal conductivity at least twice that of the stainless steel. The article, when made by the method of the present invention, has a core of copper encased with aluminum such that a copper-aluminum alloy is formed at the outer surface of the copper, and thus provides a surface having an oxidation resistance much greater than that of either aluminum or copper.

Modifications and variations of the present invention will be apparent to those having ordinary skill in the art and the invention is limited only by the following claims.

What is claimed is:

1. A composite article for initially rapid heating and subsequent continuous rapid transfer of heat comprising:
   a. a core of metallic material having a thermal conductivity not less than 130 BTU/Ft$^2$/Ft/°F/Hr;
   b. an outer surface portion encasing said core, said surface portion being formed of metallic material selected from the group consisting of aluminum, aluminum-rich alloy, nickel, or nickel-rich alloy such that said article has,
      i. progressive oxidation resistance not less than that of AISI type 303 stainless steel when exposed for at least 2 hours to 0.1 atmosphere oxygen at 800° C and,
      ii. a bulk thermal conductivity of not less than 40 BTU/Ft$^2$/Ft/°F/Hr.

2. The article defined in claim 1, wherein said core is formed of substantially copper material.

3. The article as defined in claim 1 wherein said outer surface portion has a thickness not greater than one-fifth of the thickness of said core.

4. The article as defined in claim 1, wherein said outer surface portion is formed of eutectic aluminum-silicon alloy.

5. A member for defining an auxiliary compartment of the combustion chamber of an internal combustion engine comprising:
   a. a core of generally tubular configuration having one end closed and the other end open, said tubular core being formed of metallic material having a thermal conductivity not less than 130 BTU/Ft$^2$/Ft/°F/Hr. and having
      i. at least two apertures formed in the wall thereof;
      ii. a mounting portion formed adjacent said open end and adapted for mounting to the engine combustion chamber; and,
   b. an outer surface portion encasing said core, said surface portion being formed of metallic material selected from the group consisting of aluminum, aluminum-rich alloy, nickel, or nickel-rich alloy, such that said member has
      i. progressive oxidation resistance not less than that of AISI type 303 stainless steel when exposed for at least 2 hours to 0.1 atmosphere oxygen at 800° C,
      ii. a bulk thermal conductivity of not less than 40 BTU/Ft$^2$/Ft/°F/Hr.

6. The member defined in claim 5, wherein said outer surface portion has a thickness not greater than one-fifth of the thickest section of the wall of said tubular core.

7. The member defined in claim 5, wherein said core is formed of substantially copper material.

8. The member defined in claim 5, wherein said member has the closed end of said tubular configuration formed to a substantially hemispherical shape.

9. The member defined in claim 5 wherein said surface portion is formed of aluminum-silicon eutectic alloy.

* * * * *

UNITED STATES PATENT AND TRADEMARK OFFICE
CERTIFICATE OF CORRECTION

PATENT NO. : 3,892,216
DATED : July 1, 1975
INVENTOR(S) : Louis J. Danis

It is certified that error appears in the above-identified patent and that said Letters Patent are hereby corrected as shown below:

Col. 1, line 15:    After "exhaust" insert ---emissions---.

Col. 3, line 55:    "prechamber" should be ---pre-chamber---.

Signed and Sealed this ninth Day of December 1975

[SEAL]

Attest:

RUTH C. MASON
Attesting Officer

C. MARSHALL DANN
Commissioner of Patents and Trademarks